United States Patent
Iriyama et al.

(10) Patent No.: US 7,684,294 B2
(45) Date of Patent: Mar. 23, 2010

(54) RECORDING OR REPRODUCTION APPARATUS

(75) Inventors: Toshihisa Iriyama, Kanagawa (JP); Hiroki Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1105 days.

(21) Appl. No.: 11/152,220

(22) Filed: Jun. 15, 2005

(65) Prior Publication Data
US 2005/0289564 A1 Dec. 29, 2005

(30) Foreign Application Priority Data
Jun. 25, 2004 (JP) ............................ P2004-187489

(51) Int. Cl.
*G11B 17/00* (2006.01)
(52) U.S. Cl. .................................. 369/47.36
(58) Field of Classification Search ............. 369/30.36, 369/30.47, 30.59, 30.74, 47.36; 720/600, 720/643, 644, 743, 738
See application file for complete search history.

(56) References Cited

U.S. PATENT DOCUMENTS

| 7,284,254 | B2 | 10/2007 | Obata et al. | |
|---|---|---|---|---|
| 2003/0076749 | A1* | 4/2003 | Kurita et al. | 369/13.12 |
| 2004/0052167 | A1* | 3/2004 | Tsutsumi et al. | 369/30.36 |
| 2004/0233797 | A1 | 11/2004 | Obata et al. | |

FOREIGN PATENT DOCUMENTS

| JP | 05-074028 A | 3/1993 |
|---|---|---|
| JP | 08-147846 A | 6/1996 |
| JP | 08-203192 | 8/1996 |
| JP | 2000-295510 A | 10/2000 |
| JP | 2001-223929 | 8/2001 |
| JP | 2003-259277 | 9/2003 |

OTHER PUBLICATIONS

Japanese Office Action issued for Oct. 27, 2009 for corresponding Japanese Application No. 2004-187489.

* cited by examiner

*Primary Examiner*—Joseph H Feild
*Assistant Examiner*—Ifedayo Iluyomade
(74) *Attorney, Agent, or Firm*—Rader, Fishman & Grauer PLLC

(57) ABSTRACT

A recording or reproduction apparatus is disclosed which optimizes a standby state for recording or reproduction of a cartridge disk and can achieve rapid restoration of recording action upon ejection. A shutter close mode wherein a recording medium in a cartridge recording medium is not driven by a driving section and a shutter mechanism is closed can be maintained as one of modes during a loading process of the cartridge recording medium to achieve a dust preventing effect, a collision preventing effect with a head and a power saving effect while the cartridge recording medium is in a standby state. If a request to discharge the cartridge recording medium is issued, then the successive changeover from a drive on mode to a drive off mode shutter close mode eject mode is controlled using individual commands for the modes.

14 Claims, 11 Drawing Sheets

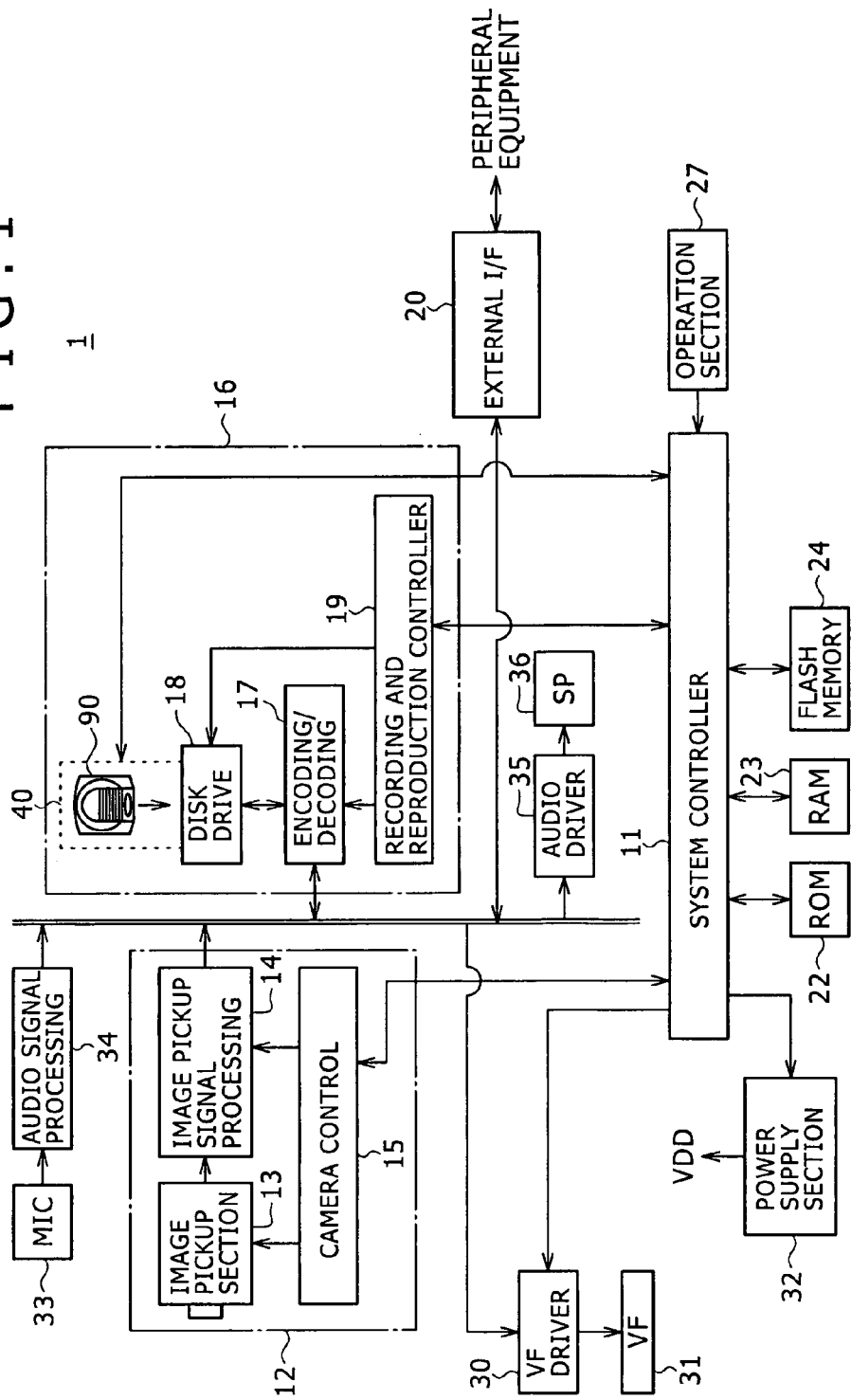

EJECT

SHUTTER CLOSE

DRIVE OFF

DRIVE ON

RECORDING/ REPRODUCTION

RECORDING OR REPRODUCTION APPARATUS

BACKGROUND OF THE INVENTION

This invention relates to a recording or reproduction apparatus for use with a cartridge recording medium wherein a recording medium such as an optical disk is accommodated in a cartridge such that it is exposed/covered by opening/closing of a shutter mechanism formed on the cartridge.

Various disks on which data can be recorded by the user side such as optical disks, magneto-optical disks and magnetic disks have been and are being developed and popularized. As such disks, write-once disks on which data can be written once and rewritable disks on which data can be rewritten are known.

Such disk media as described above are suitable for recording of video and audio signals and used in various recording and/or reproduction systems such as, for example, image pickup apparatus such as video cameras and sound recording apparatus such as audio recorders.

Further, in the field of disk media, increase in capacity by higher-density recording has been and is being promoted. In recent years, large capacity media which are ready for recording of high definition video signals such as disks of the DVD (Digital Versatile Disc) type and blue ray disks (Blu-Ray disc) have been and are being developed.

A blue ray disk is influenced significantly by foreign matters such as dust and soil because of high-density recording thereof. Therefore, the blue ray disk is accommodated in a cartridge which is structured such that, when the blue ray disk is to be recorded or reproduced, a shutter of the cartridge is opened.

SUMMARY OF THE INVENTION

Incidentally, an image pickup apparatus such as a video camera or an apparatus such as an audio recorder significantly requires a countermeasure against dust or soil where it is taken into consideration that it may be used in various environments such as outdoors.

Where a disk is of the cartridge type, the disk is protected by the cartridge so that dust or soil may not stick to the recording surface of the disk. However, according to an actual manner of use, where a user carries an image pickup apparatus in order to take up an image, the cartridge disk is often left loaded in the image pickup apparatus. That the cartridge disk is left loaded is appropriate also in that image pickup can be performed just at a timing.

Usually, however, the cartridge disk loaded in the image pickup apparatus is in a state wherein the shutter is kept open by a loading mechanism in the image pickup apparatus. In other words, the cartridge disk is kept in a state wherein the dust preventing function for the disk by the cartridge disk is not exhibited. Therefore, that the cartridge disk is kept in the image pickup apparatus is not preferable in that the disk thereof is in an open state to foreign matters such as dust which may be admitted into the image pickup apparatus.

Meanwhile, it is demanded for a recording apparatus such as a video camera to be capable of starting recording rapidly without losing a recording timing. Although recording action cannot be performed particularly during loading or unloading action of a disk, it is demanded to minimize the time required before recording can be started so that a chance of image pickup or sound recording may not be lost. A technique for making it possible to start recording rapidly is disclosed, for example, in Japanese Patent Laid-Open No. 2001-223929 (hereinafter referred to as Patent Document 1), Japanese Patent Laid-Open No. 2003-259277 (hereinafter referred to as Patent Document 2) or Japanese Patent Laid-Open No. Hei 8-203192 (hereinafter referred to as Patent Document 3).

Further, video cameras or like apparatus which are used outside are driven principally by a battery. To this end, also minimization of the power consumption is significant.

Thus, it is desirable to provide a recording or reproduction apparatus which implements a dust preventing function for a cartridge recording medium loaded therein.

It is also desirable to provide a recording or reproduction apparatus which can be placed into a recordable state rapidly and operates with reduced power consumption.

According to the present invention, there is provided a recording or reproduction apparatus for use with a cartridge recording medium wherein a recording medium is accommodated in a cartridge in such a manner as to be exposed/covered by opening/closing of a shutter mechanism formed in the cartridge, including a driving section for driving the recording medium of the cartridge recording medium to perform recording or reproduction action (for example, driven to rotate), a head section for recording or reproducing information on or from the recording medium driven by the driving section, a loading section for opening the shutter mechanism of the cartridge recording medium inserted therein and loading the cartridge recording medium into a state wherein the recording medium can be recorded or reproduced by the driving section and the head section, and a control section for controlling action of the loading section, driving section and head section. The control section being operable to control an action mode of the loading section to a shutter close mode wherein at least the recording medium is not driven by the driving section and the shutter mechanism is closed as one of modes during transition between an eject mode wherein the cartridge recording medium is not inserted in the loading section and a drive on mode wherein the recording medium in the cartridge recording medium is driven by the driving section.

Preferably, the control section is operable to control the action mode of the loading section to a drive off mode wherein the driving by the driving section is in an off state and the recording medium is spaced away from the driving section and besides the shutter mechanism is open as another one of modes during the transition between the shutter close mode and the drive on mode.

Preferably, the control section issues, when a request to discharge the cartridge recording medium is issued, at least a shutter close instruction to the loading section to close the shutter mechanism into the closed state and then issues an eject instruction to the loading section to establish the eject mode.

Preferably, the control section issues, when a request to discharge the cartridge recording medium is issued in the drive on mode, a drive off instruction to the loading section to establish the drive off mode and then issues a shutter close instruction to the loading section to establish the shutter close mode, and thereafter issues an eject instruction to the loading section to establish the eject mode.

Preferably, if the control section detects, when the request to discharge is issued, that a recording or reproduction request is issued at a point of time before the eject instruction is issued, then the control section interrupts the control triggered by the request to discharge and then issues a drive on instruction to the loading section to establish the drive on mode, and then controls the head section to start recording or reproduction action on or from the recording medium.

Preferably, the control section issues, when a power supply off request is issued, at least a shutter close instruction to the loading section to establish the shutter close mode and then performs control to switch off the power supply.

Preferably, the control section issues, when recording or reproduction action is not performed for more than a predetermined period of time, a shutter close instruction to the loading section to establish the shutter close mode. Or, the control section may issue, when recording or reproduction action is not performed for more than a predetermined period of time, a drive off instruction to the loading section to establish the drive off mode.

In summary, in the recording or reproduction apparatus of the present invention, it is possible to maintain the loading section in the shutter close mode wherein the recording medium in the cartridge recording medium is not driven by the driving section and the shutter mechanism is closed as one of modes in the loading process of the cartridge recording medium.

Further, if a request to discharge the cartridge recording medium is issued, then, for example, a shutter close instruction is issued in the drive on mode to establish the shutter close mode, and then an eject instruction is issued to establish the eject mode. In other words, the transmission of the drive on mode→shutter close mode→eject mode is controlled using individual commands.

Or, also where a drive on mode, a drive off mode, a shutter close mode and an eject mode are available, the transmission of the drive on mode→drive off mode→shutter close mode→eject mode is controlled using individual commands.

With the recording or reproduction apparatus of the present invention, the loading section can be maintained in the shutter close mode wherein the recording medium in the cartridge recording medium is not driven (for example, driven to rotate) by the driving section and the shutter mechanism is closed as one of modes during the loading process of the cartridge recording medium. In other words, in the recording or reproduction apparatus, the recording medium in the cartridge recording medium can be maintained in a state wherein it is protected by the shutter mechanism, and it is possible to prevent foreign matters such as dust from sticking to the recording medium. This is very useful for prevention of dust in such a case that, for example, the recording or reproduction apparatus is carried or stowed while the cartridge recording medium is left accommodated therein or that the cartridge recording medium is standby for recording or reproduction.

Further, in the drive off mode, the recording medium is kept spaced away from the driving section. Therefore, when the recording or reproduction apparatus is in a standby state, otherwise possible collision between the head section and the disk by vibration or the like can be prevented, and consequently, protection of the head and data of the disk can be anticipated. This is preferable particularly where the recording or reproduction apparatus is carried or in a like case. Further, since driving by the driving section is kept off, a power saving effect in the standby state can be anticipated. Furthermore, since the shutter mechanism is in an open state, recording or reproduction operation for the disk can be restored rapidly.

Further, when the loading mode is changed over from a certain mode to the shutter close mode→eject mode in response to an eject request, or when the loading mode is changed over from a certain mode to the drive on mode→drive off mode→shutter close mode→eject mode in response to an eject request, individual commands (instructions) for establishing the modes are successively issued. Consequently, restoration of the recording or reproduction action can be performed rapidly in the course of the eject request.

In particular, since the changeover up to the eject mode is not executed as a series of actions with a single command, if the control section detects that a recording or reproduction request is issued at a point of time at which an eject instruction is issued while the control section successively issues instructions to change over the loading mode to the individual modes in response to a discharge (eject) request, the control section can interrupt the changeover up to the eject mode and restore the recording or reproduction action state. Naturally at this time, since the cartridge recording medium is not discharged as yet, the apparatus does not require reading out of management information for recording or reproduction of the recording medium of the cartridge recording medium but can start the recording or reproduction operation immediately.

Consequently, recording/reproduction can be started without waiting for action which requires a comparatively long period of time such as a period of time required for completion of eject, a period of time required for re-loading and a period of time required for reading out of management information from a recording medium upon re-loading. This is very advantageous in that, if the recording or reproduction apparatus is an image pickup apparatus, then image pickup can be performed without losing an image pickup chance and so forth.

Further, when a power supply off request is issued, since the shutter close mode is established and then the power supply is switched off, the cartridge recording medium in the apparatus when the power supply is off can be kept in a state wherein the shutter mechanism is closed. Consequently, the dust preventing function described above can be exhibited effectively.

Further, since the shutter close mode is established when recording or reproduction action is not performed for more than a predetermined period of time, the dust preventing function can be exhibited during the standby for recording or reproduction.

Furthermore, where the shutter close mode or the drive off mode is established when recording or reproduction action is not performed for more than a predetermined period of time, since this stops the driving of the driving section, a power saving effect can be anticipated. This is preferable particularly where the recording or reproduction apparatus is of the battery driven type. Further, since the recording medium and the head section are spaced away from each other, otherwise possible collision between them by vibration or the like can be prevented, and also a protection effect of the head and the medium can be anticipated.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram of an image pickup apparatus to which the present invention is applied;

DETAILED DESCRIPTION OF THE PREFERRED EMBODIMENT

In the following, a recording or reproduction apparatus to which the present invention is described in detail with reference to the accompanying drawings. The recording or reproduction apparatus according to the embodiment of the present invention described below is formed as an image pickup apparatus, particularly a video camera, which performs recording and reproduction of picked up video data. The description proceeds in the following order:

1. Structure of the Cartridge Disk
2. Configuration of the Image Pickup Apparatus
3. Transition of the Loading Mode
4. Process upon Ejection Operation
5. Process upon Power Off Operation
6. Process When No Recording/Reproduction Operation Is Performed
7. Advantages of the Embodiment and Modifications 1. Structure of the Cartridge Disk First, the structure of a cartridge disk used as a recording medium in the image pickup apparatus according to the present embodiment is described with reference to FIGS. 8 to 11.

Figure 8:
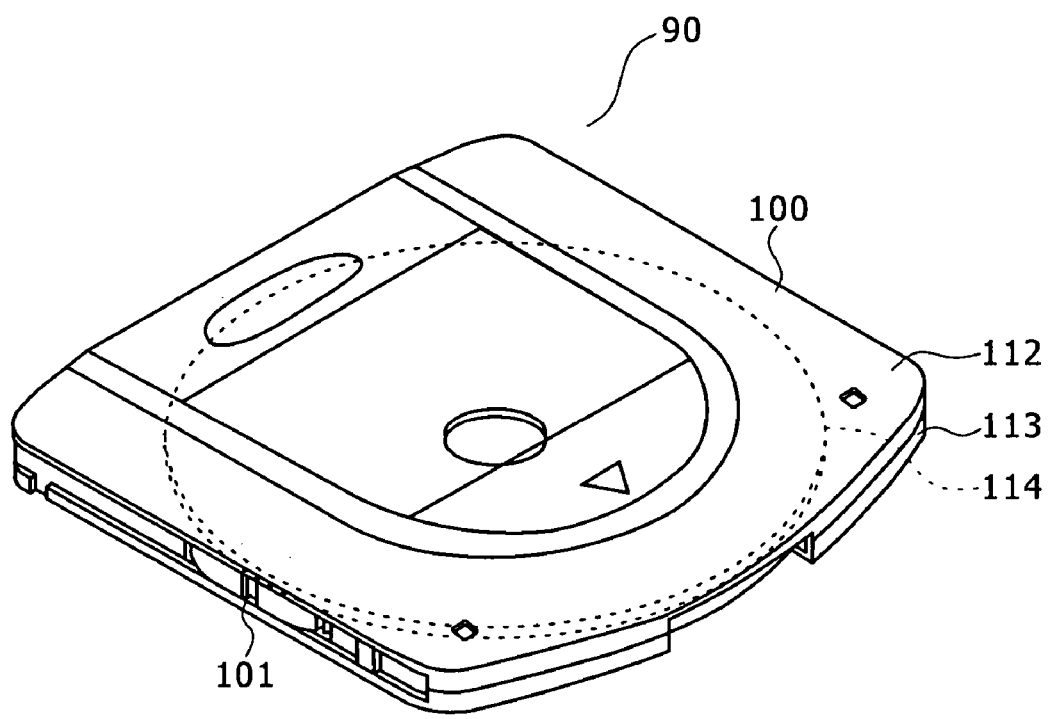
FIG. 8 is a perspective view of a cartridge disk.
Figure 9:
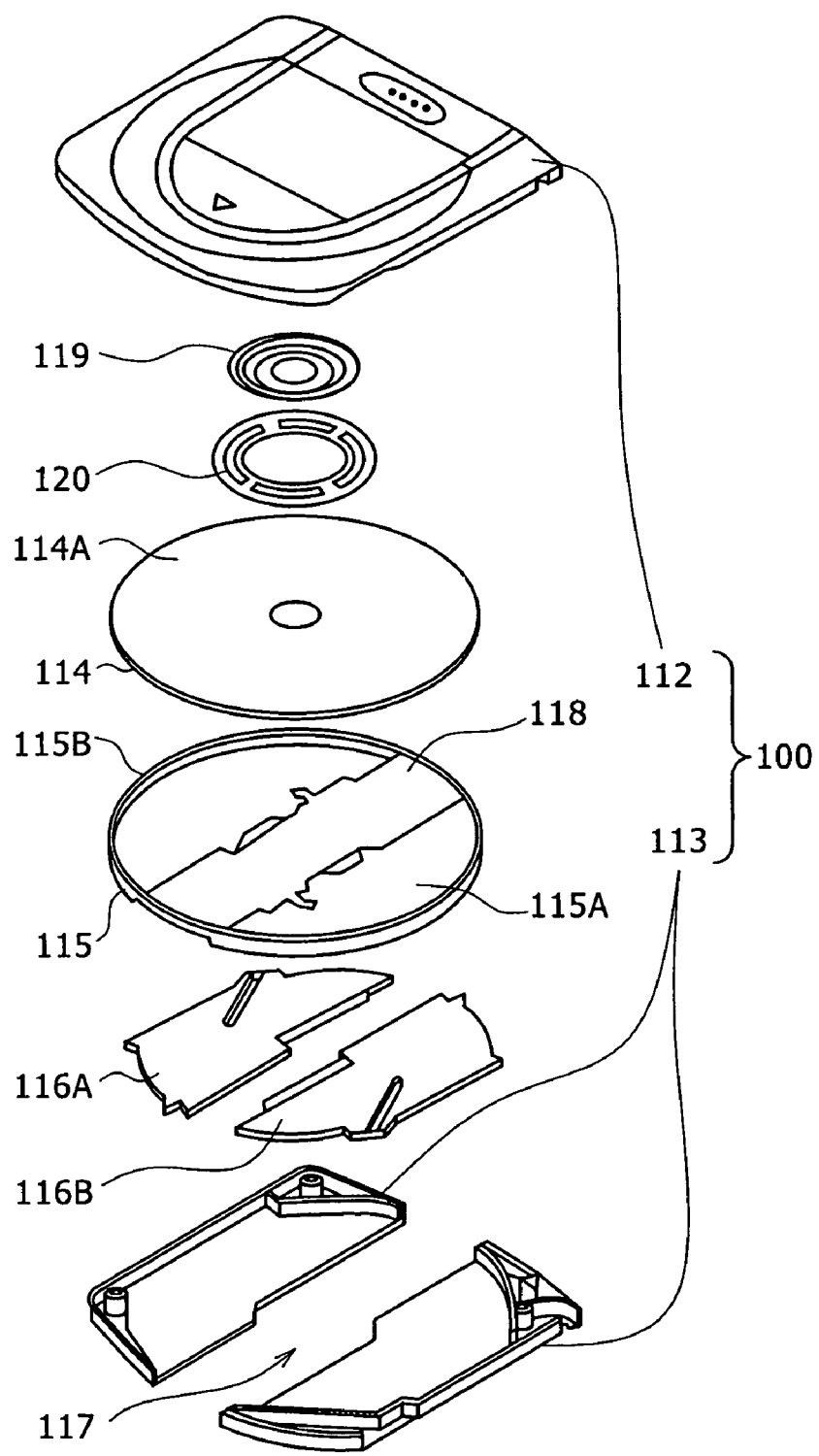
FIG. 9 is an exploded perspective view of the cartridge disk of FIG. 8.
Figure 10:
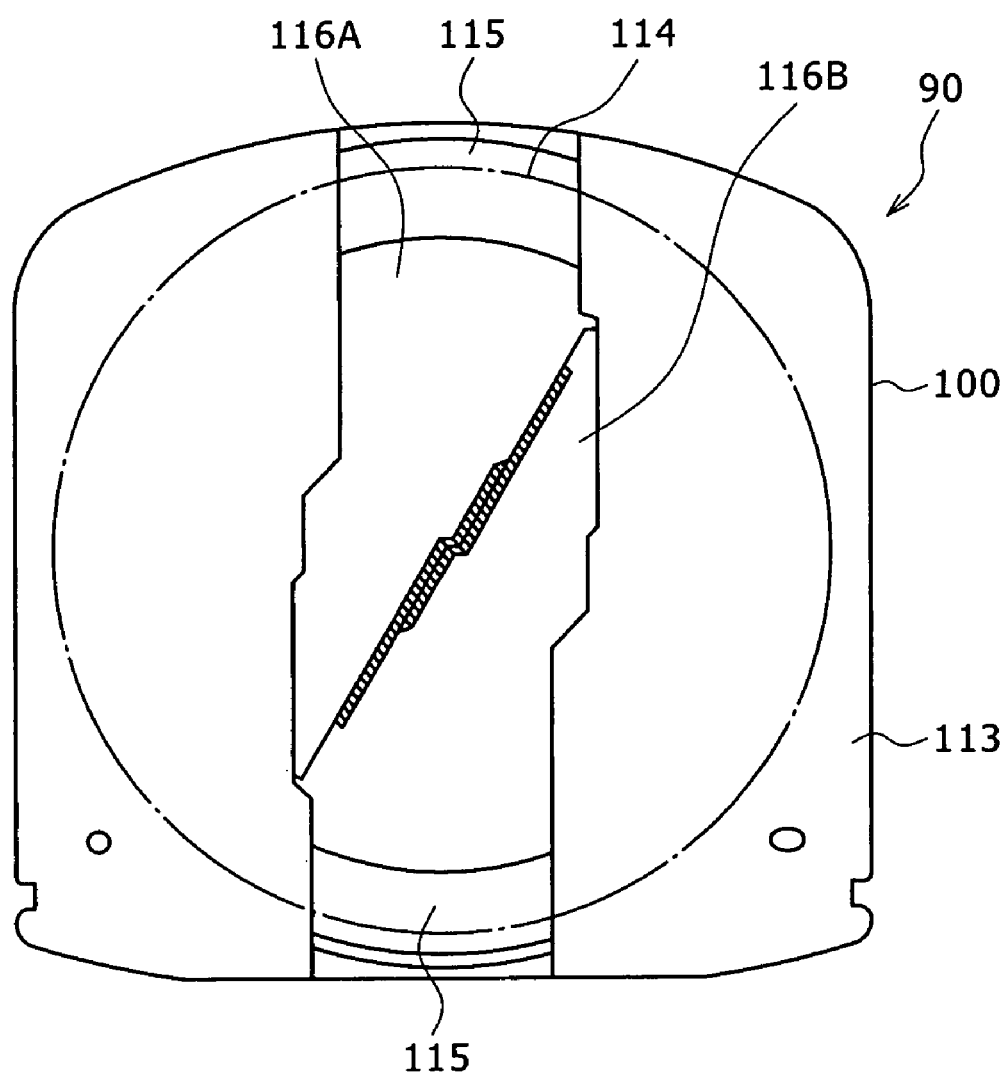
FIG. 10 is a bottom plan view of the cartridge disk of FIG. 8 when a shutter is in a closed state.
Figure 11:
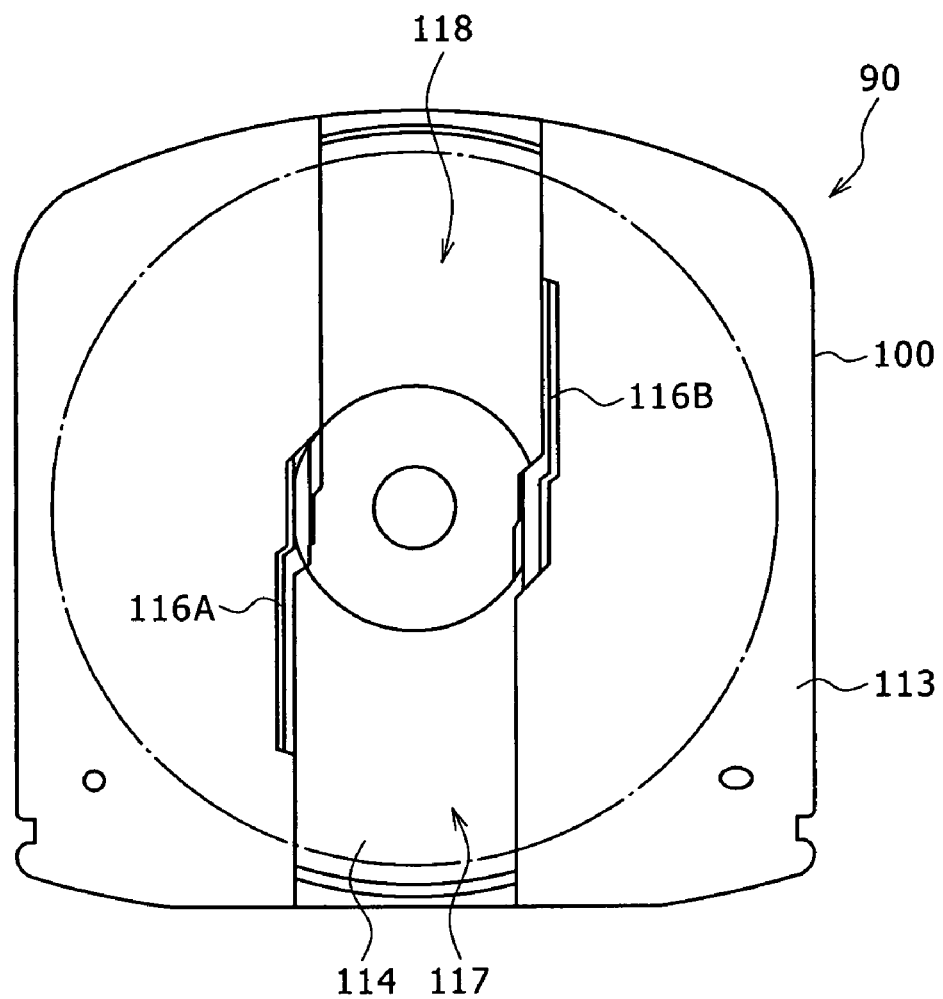
FIG. 11 is a bottom plan view of the cartridge disk of FIG. 8 when the shutter is in an open state.

FIGS. 8 and 9 show a cartridge disk 90 of the inner rotor type adopted in a blue ray disk system. FIG. 10 shows the cartridge disk 90 where the disk is covered with a shutter mechanism, and FIG. 11 shows the cartridge disk 90 where the disk is exposed with the shutter opened.

The cartridge disk 90 includes upper and lower shells 112 and 113 each formed from a molded part such as a molded article of a synthetic resin material or the like and cooperatively forming a cartridge 100 in the form of a generally flattened housing as seen in FIG. 8. A disk 114 is accommodated in the cartridge 100 such that it is inserted horizontally in an inner rotor 115 shown in FIG. 9 with an information recording face thereof directed downwardly.

A disk clamper 119 in the form of a disk made of a ferromagnetic material such as SUS is disposed just above the center hole of the disk 114. The disk clamper 119 is supported horizontally for rotation and also for upward and downward movement in a clamper support ring 120 coupled to a lower face of the upper shell 112 by welding or the like.

The inner rotor 115 has a structure as a thin plate formed from a molded part or the like and is accommodated for rotation in the cartridge 100 formed from the upper and lower shells 112 and 113. A pair of shutters 116a and 116b each in the form of a thin plate formed from a molded part or the like are attached horizontally for rotation below the inner rotor 115. The inner rotor 115 is formed as a circular dish and has a cylindrical outer circumferential wall 115b formed vertically uprightly on an outer periphery of a bottom portion 115a formed as a disk. The inner rotor 115 is placed for horizontal rotation with a gap left above the lower shell 113, and the outer circumferential wall 115b of the inner rotor 115 is inserted for rotation in a vertical, downwardly directed cylindrical groove formed on the inner side of an outer circumferential portion of the upper shell 112.

The disk 114 is placed horizontally for rotation and also for upward and downward movement on the bottom portion 115a of the inner rotor 115. The inner rotor 115 is driven by a loading mechanism (shutter opening/closing mechanism) of an apparatus, in which the cartridge 100 is inserted, to rotate between an opening position and a closing position within the cartridge 100.

A bottom opening 117 is formed in the lower shell 113 which serves as a lower face of the cartridge 100, and an internal opening 118 having a substantially same shape as that of the bottom opening 117 is formed also in the bottom portion 115a of the inner rotor 115. The bottom opening 117 is normally held in a state wherein it is covered with the shutters 116a and 116b as seen in FIG. 10.

Although detailed description is omitted herein, if the cartridge disk 90 is inserted into the recording and reproduction apparatus, then the inner rotor 115 is rotated by a mechanism on the recording and reproduction apparatus side. In response to the rotation of the inner rotor 115, the shutters 116a and 116b connected to the inner rotor 115 by a cam mechanism are rotated. This rotational movement is performed until the shutters 116a and 116b come to a position at which the bottom opening 117 is opened. Consequently, the information recording surface of the disk 114 is exposed to the lower face side of the cartridge through the bottom opening 117 and the internal opening 118 as seen in FIG. 11.

On the recording and reproduction apparatus side, an optical head, a chucking mechanism, a spindle mechanism and so forth are disposed on the recording face side of the disk 114 exposed in such a manner as described above. Thus, the disk 114 is rotated by the spindle mechanism and information is recorded on or reproduced from the disk 114 by the optical head.

2. Configuration of the Image Pickup Apparatus

A configuration of an image pickup apparatus 1 of the present embodiment is shown in FIG. 1.

Referring to FIG. 1, a system controller 11 is formed from a microcomputer and controls the entire image pickup apparatus 1. In particular, the system controller 11 performs operation control of components described below.

A camera section 12 is a block for picking up an image and includes an image pickup section 13, an image pickup signal processing section 14 and a camera control section 15.

The image pickup section 13 includes a lens system formed from an image pickup lens, an iris and so forth, a driving system for driving the lens system to perform focusing action and zooming action, a solid-state image pickup element array for detecting and photoelectrically converting pickup image light obtained by the lens system to produce an image pickup signal, and so forth. The solid-state image pickup element array may be, for example, a CCD sensor array or a CMOS sensor array.

The image pickup signal processing section 14 includes a sample hold/AGC (Automatic Gain Control) circuit for performing gain adjustment and waveform shaping of a signal obtained by the solid-state image pickup elements of the image pickup section 13, and a video A/D converter. The image pickup signal processing section 14 produces digital video data of the picked up image.

The camera control section 15 controls action of the image pickup section 13 and the image pickup signal processing section 14 in accordance with an instruction from the system controller 11. For example, the camera control section 15 controls the image pickup section 13 so as to perform automatic focusing, automatic exposure adjustment, iris adjustment, zooming action and so forth, and actually controls motors for the just mentioned operations.

The camera control section 15 includes a timing generator and uses timing signals generated by the timing generator to control signal processing action of the solid-state image pickup elements and the sample hold/AGC circuit and the video A/D converter of the image pickup signal processing section 14.

The camera section 12 having the components described above produces image pickup video data.

Meanwhile, a sound signal obtained by a microphone 33 is subject to A/D conversion by a audio signal processing section 34 so that audio data synchronized with the image pickup video data is produced.

A recording and reproduction section 16 is a block for recording image pickup video data obtained by the camera section 12 (and audio data obtained by the microphone 33) on a recording medium (cartridge disk 90) or reproducing sound data from the recording medium.

The recording and reproduction section 16 includes an encoding/decoding section 17, a disk drive 18 and a recording and reproduction controller 19.

A cartridge disk 90 inserted by a user is fed by a loading mechanism 40, and the shutter mechanism is opened as described above so that the cartridge disk 90 is placed into a state wherein it can be recorded or reproduced by the disk drive 18.

The loading mechanism 40 performs action of changeover among various loading modes (eject, shutter close, drive off and drive on) hereinafter described in accordance with a command from the system controller 11 (or recording and reproduction controller 19).

The encoding/decoding section 17 performs, upon image pickup, such processes as conversion of the format of image pickup video data obtained by the camera section 12 into a recording format for the cartridge disk 90 and so forth. The encoding/decoding section 17 further performs format conversion of audio data. It is to be noted that the encoding/decoding section 17 may perform such a processing mode as to compress video and audio data in accordance with the MPEG (Moving Picture Experts Group) system or some other compression system and record the compressed data on the cartridge disk 90.

The image pickup video data (and audio data) processed by the encoding/decoding section 17 are supplied to the disk drive 18, by which they are recorded on the cartridge disk 90 (disk 114 in the cartridge 100 described hereinabove) loaded therein.

On the other hand, upon reproduction of data recorded on the disk 114, video data (and audio data) reproduced by the disk drive 18 are decoded by the encoding/decoding section 17.

The recording and reproduction controller 19 performs control relating to processing of the encoding/decoding section 17, recording and reproduction action by the disk drive 18 and inputting/outputting of data in accordance with an instruction from the system controller 11.

Further, the recording and reproduction controller 19 controls the disk drive 18 to execute reading out or writing of management information such as, for example, a file system or a play list and editing of data recorded on the cartridge disk 90 as a result of updating of such management information.

Image pickup video data obtained by the camera section 12 upon image pickup or video data reproduced from the cartridge disk 90 can be displayed on a viewfinder 31.

When the camera section 12 outputs image pickup video data during execution of image pickup or during standby for image pickup, the image pickup video data are supplied to a viewfinder driver 30.

The viewfinder driver 30 performs action of causing the viewfinder 31 to display a video image based on image pickup video data in accordance with an instruction from the system controller 11. Further, the viewfinder driver 30 causes the viewfinder 31 to display a character image in an overlapping relationship in accordance with an instruction from the system controller 11.

On the other hand, upon reproduction of video data from the cartridge disk 90, video data reproduced by and outputted from the disk drive 18 and decoded by the encoding/decoding section 17 are supplied to the viewfinder driver 30. The viewfinder driver 30 performs action of causing the viewfinder 31 to display a video image based the video data and a character image to be displayed in an overlapping relationship in accordance with an instruction from the system controller 11.

Accordingly, an image pickup person (cameraman) can watch the viewfinder 31 to perform standby for image pickup (confirmation of an image pickup subject) and monitoring upon image pickup, checking of the substance of a video image recorded on the cartridge disk 90, or simple editing operation.

It is to be noted that the image pickup apparatus 1 may further include a display section such as a liquid crystal display section so that a video image being picked up or being reproduced can be displayed similarly to the viewfinder 31.

Meanwhile, audio data reproduced from the cartridge disk 90 are converted from digital data into analog data and undergo signal processes such as filtering and amplification by an audio driver 35 and then outputted from a speaker section 36.

An external interface 20 is a block for inputting and outputting video data and so forth from and to an external apparatus such as an audio-visual apparatus, an information apparatus or a storage apparatus.

A ROM 22, a RAM 23 and a flash memory 24 are each used as a storage area or an arithmetic operation area for data or a program necessary for the system controller 11.

For example, a processing program for the system controller 11, fixed data and so forth are stored in the ROM 22. The RAM 23 is used for temporary storage of information or as a working area. The flash memory 24 stores various control coefficients and so forth.

An operation section 27 includes various operation elements prepared thereon for operation of the image pickup apparatus 1. In particular, the operation section 27 includes operation elements for power supply on/off operations, an image pickup operation (recording operation), a reproduction operation, a stopping operation of recording or reproduction, a zooming operation, various mode operations, an editing operation, an eject operation and so forth.

The system controller 11 controls the components in response to an operation of any of the operation elements by the user so that necessary action may be executed by the components.

A power supply section 32 makes use of, for example, a DC power supply obtained from a built-in battery through a DC/DC converter or a DC power supply produced from a commercial AC power supply through a power supply adapter to supply power supply voltages of required levels to the circuit components. The power supply on/off by the power supply section 32 is controlled by the system controller 11 in response to a power supply operation from the operation section 27.

3. Transition of the Loading Mode

Mode transition or mode changeover by the loading mechanism 40 of the image pickup apparatus 1 is described.

FIGS. 2A to 2E schematically illustrate a loading procedure of the cartridge disk 90. In the example illustrated, the mode changeover by the loading mechanism 40 is performed among an eject mode, a shutter close mode, a drive off mode and a drive on mode illustrated in FIGS. 2A to 2D, respectively.

It is to be noted that, though not shown in FIGS. 2A to 2E, the loading mechanism 40 incorporates a mechanism and a motor for feeding a holder 41, a mechanism for opening and closing the shutter mechanism, sensors for detecting establishment of the modes, and so forth. For example, the system controller 11 detects the mode of the loading mechanism 40 using the sensors and issues a required command to cause the loading mechanism 40 to execute required action.

Further, the disk drive 18 shown includes a spindle mechanism 18*a*, a chucking section 18*c* and an optical pickup 18*b* as apparatus sections provided therein.

Figure 2A:
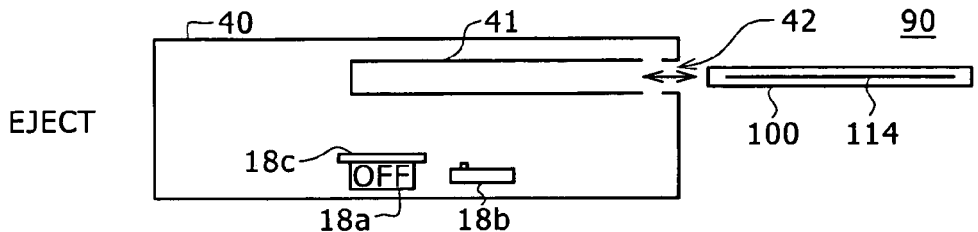
FIGS. 2A to 2E are schematic views illustrating different modes in a loading procedure of the image pickup apparatus of FIG. 1.

FIG. 2A illustrates the eject mode in which the cartridge disk 90 is discharged outside the image pickup apparatus. The holder 41 is a mechanism for holding the cartridge disk 90 inserted in the image pickup apparatus and is positioned, in the eject mode, so that it can receive the cartridge disk 90 inserted from an insertion-discharging section 42.

Figure 2B:
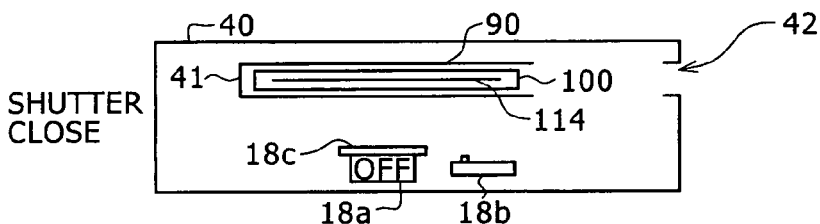

FIG. 2B illustrates the shutter close mode, in which the cartridge disk 90 is loaded in the inside of the apparatus but the shutters 116*a* and 116*b* described hereinabove are closed. For example, if, in the eject mode of FIG. 2A, the cartridge disk 90 is inserted from the insertion-discharging section 42, then the holder 41 is fed to its position in the shutter close mode of FIG. 2B.

Figure 2C:
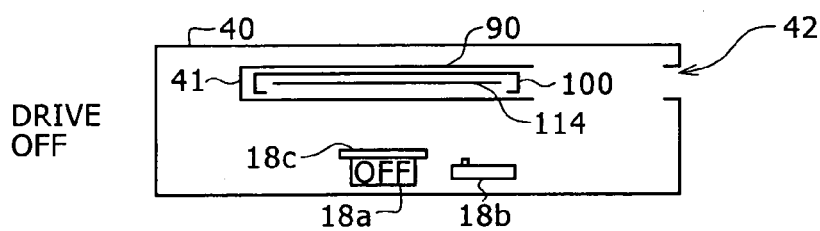

FIG. 2C illustrates the drive off mode, in which the shutters 116*a* and 116*b* of the cartridge disk 90 are opened by a shutter opening/closing driving mechanism not shown. However, in the drive off mode illustrated, the disk 114 is not chucked by the chucking section 18*c* of the spindle mechanism 18*a* but is positioned spaced away from the spindle mechanism 18*a* and the optical pickup 18*b*.

Figure 2D:
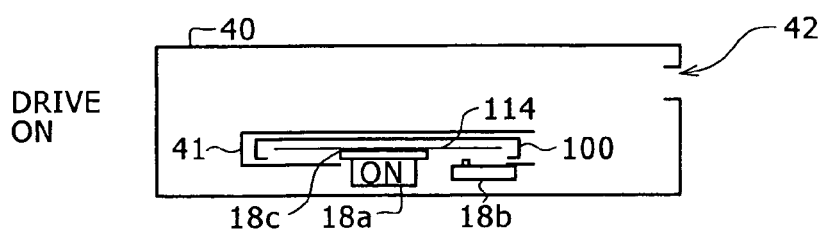

FIG. 2D illustrates the drive on mode, in which the disk 114 of the cartridge disk 90 whose shutters 116*a* and 116*b* are open is chucked by the chucking section 18*c* of the spindle mechanism 18*a* and driven to rotate by the spindle mechanism 18*a*. It is to be noted that, in the drive off mode and the shutter close mode, the spindle mechanism 18*a* is in an off state and does not rotate.

Figure 2E:
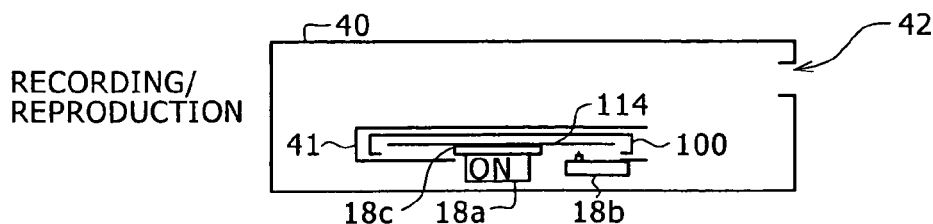

If a recording or reproduction instruction is issued in the drive on mode, then recording or reproduction is performed using a laser beam from the optical pickup 18*b* as seen in FIG. 2E.

Action which involves such changeover among the modes as described above in the present example is described with reference to FIGS. 3 and 4.

Figure 3:
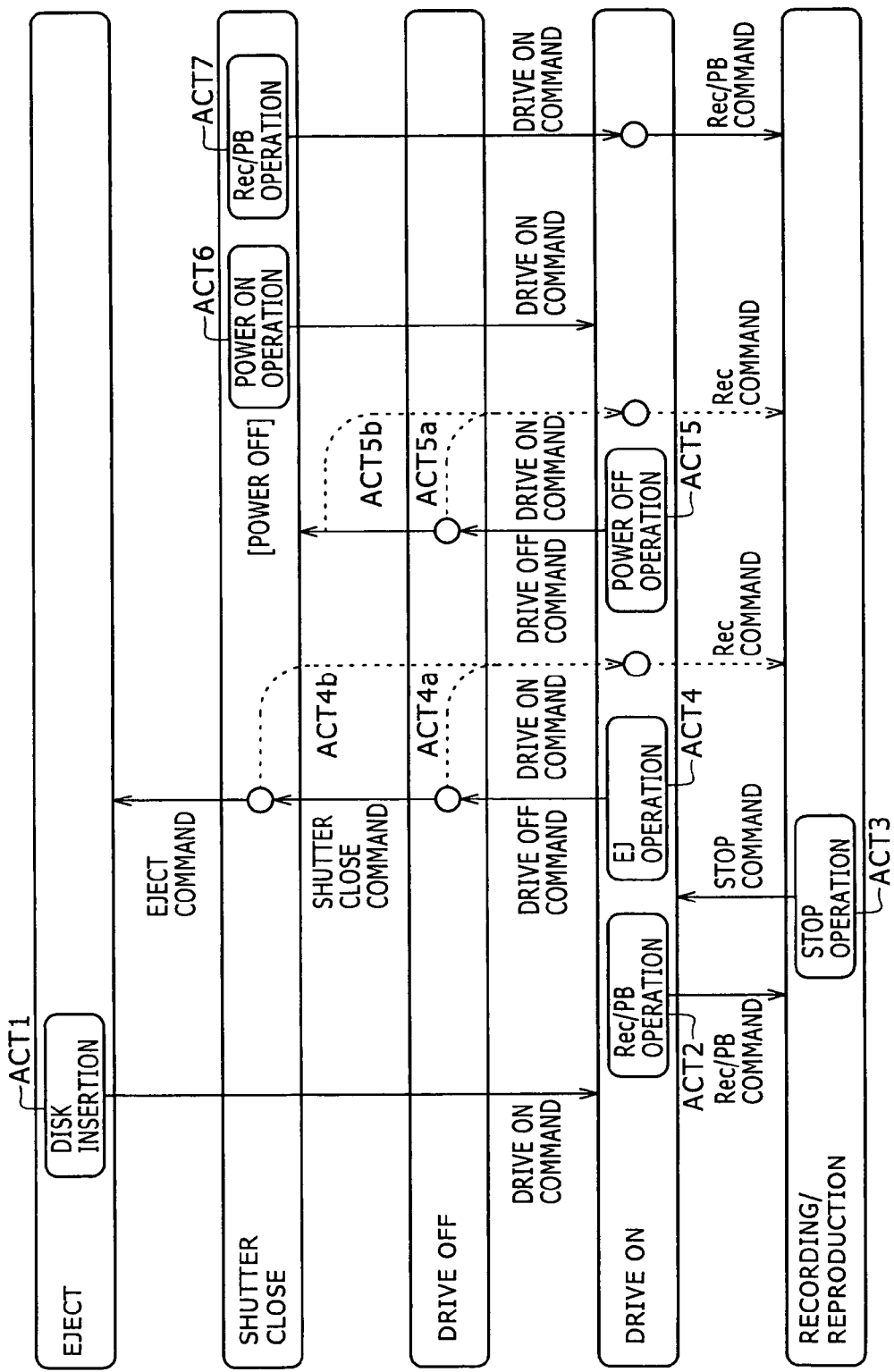
FIGS. 3 and 4 are diagrammatic views illustrating an example of transition of the loading mode of the image pickup apparatus of FIG. 1.
Figure 4:
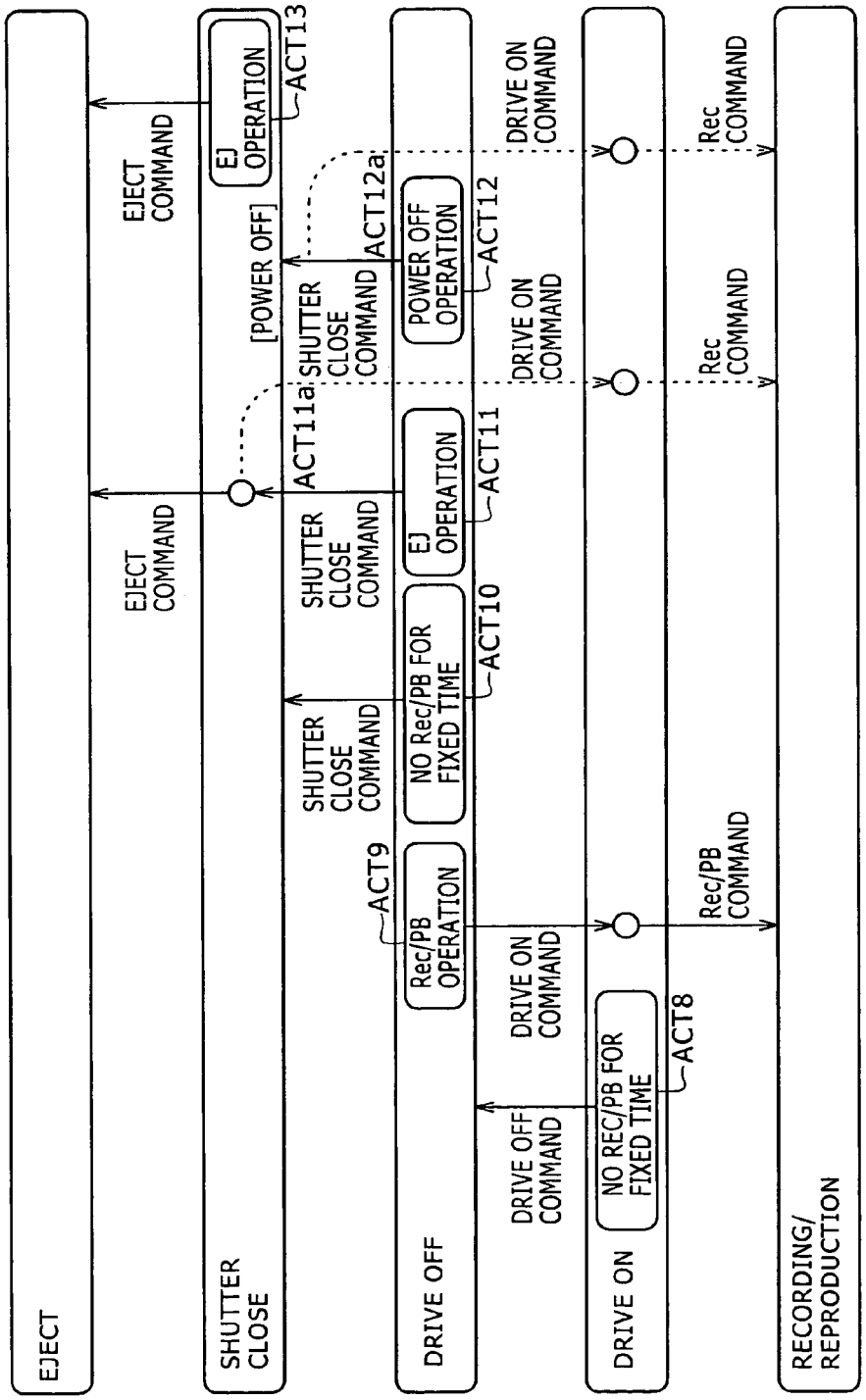

In FIGS. 3 and 4, changeover actions of the loading mode performed using a certain operation or the like as a trigger are denoted by act1 to act13. The actions are described individually.

.act1: when the cartridge disk 90 is inserted from the insertion-discharging section 42.

If the system controller 11 detects in the eject mode that the cartridge disk 90 is inserted, then the system controller 11 issues a drive on command to the loading mechanism 40 so that the loading mode may be successively changed over like the shutter close mode→drive off mode→drive on mode. The shutter close mode or the drive off mode is only passed during the changeover process, and the drive on mode is established by a series of actions. The recording and reproduction controller 19 controls the spindle mechanism 18*a* to rotate at a point of time at which chucking of the disk 114 is completed.

It is to be noted that, when the cartridge disk 90 is inserted, since it is necessary to first read in management information recorded on the disk 114, immediately after the drive on mode is established, the recording and reproduction controller 19 controls the disk drive 18 to perform reading out action of the management information. As the management information is read out, later recording or reproduction of data on or from the disk 114 is enabled.

.act2: when a recording or reproduction operation is performed in the drive on mode.

If the user performs an operation on the operation section 27 to issue a recording (recording of image pickup video data) or reproduction instruction, then the system controller 11 issues a recording command (Rec) or a reproduction command (PB) to the recording and reproduction controller 19 to cause the disk drive 18 to execute recording or reproduction. In short, a recording/reproduction mode illustrated in FIG. 2E is entered.

.act3: when a stopping operation is performed during recording or reproduction.

If the user performs a stopping operation on the operation section 27 during recording or reproduction, then the system controller 11 sends a stopping command to the recording and reproduction controller 19 to end the recording or reproduction action by the disk drive 18. Consequently, the loading section 40 enters the drive on mode illustrated in FIG. 2D. At this point of time, the spindle mechanism 18*a* remains driven to rotate, and accordingly, if the user performs a recording or reproduction operation again, then the recording or reproduction can be started immediately.

.act4: when an eject operation is performed in the drive on mode.

If the user performs an eject operation for discharging the cartridge disk 90 on the operation section 27 in the drive on mode, then the system controller 11 issues commands in the following manner to the loading mechanism 40.

First, the system controller 11 issues a drive off command so that the loading mode is changed over to the drive off mode. At this time, the recording and reproduction controller 19 controls the spindle mechanism 18*a* to end the rotational driving.

After the changeover to the drive off mode is completed, the system controller 11 now issues a shutter close command so that the loading mode is changed over to the shutter close mode.

After the changeover to the shutter close mode is completed, the system controller 11 issues an eject command so that the loading mode is changed over to the eject mode. The discharging of the cartridge disk 90 is completed thereby.

It is to be noted that, although details are hereinafter described, if the user performs a recording operation during the process of the changeover to the eject mode, the recording action is restored as indicated by an arrow mark act4*a* or act4*b* of a broken line.

For example, if a recording operation of the user is detected before the shutter close command is issued, then the system controller 11 does not issue the shutter close command but issues the drive on command to change over the loading mode to the drive on mode and then issues the recording command (Rec) to the recording and reproduction controller 19 so that recording action by the disk drive 18 may be performed (act4*a*).

On the other hand, even after the shutter close command is issued, if a recording operation of the user is detected before the eject command is issued, then the system controller 11 does not issue the eject command but issues the drive on command to change over the loading mode to the drive on mode and then issues the recording command (Rec) to the recording and reproduction controller 19 so that recording action may be performed by the disk drive 18 (act4*b*).

.act5: when a power on operation is performed in the drive on mode.

If the user performs a power supply switching off operation of the image pickup apparatus 1 on the operation section 27 in the drive on mode, then the system controller 11 issues commands in the following manner to the loading mechanism 40.

First, the system controller 11 issues the drive off command to change over the loading mode to the drive off mode. At this time, the recording and reproduction controller 19 controls the spindle mechanism 18*a* to end the rotational driving.

After the changeover to the drive off mode is completed, the system controller 11 issues the shutter close command to change over the loading mode to the shutter close mode.

Further, after the changeover to the shutter close mode is completed, the system controller 11 performs power supply off control for the power supply section 32.

It is to be noted that, in this instance, if the user performs a recording operation during the process before the power supply off control is performed, then the recording action can be restored as indicated as an arrow mark act5*a* or act5*b* of a broken line.

For example, if a recording operation of the user is detected before the shutter close command is issued, then the system controller 11 does not issue the shutter close command but issues the drive on command to changeover the loading mode to the drive on mode and the issues the recording command to the recording and reproduction controller 19 so that recording action by the disk drive 18 may be performed (act5*a*).

On the other hand, even after the shutter close command is issued, if a recording operation of the user is detected before the power supply off control is performed, then the system controller 11 does not perform the power supply off control but issues the drive on command to change over the loading mode to the drive on mode and then issues the recording command to the recording and reproduction controller 19 so that the recording action may be performed by the disk drive 18 (act5*b*).

.act6: when a power on operation is performed in the shutter close mode.

If a power supply on operation is performed while the power supply is off in the shutter close mode, then the system controller 11 controls the power supply section 32 to make the power supply available and controls the loading mechanism 40 with the drive on command so that the loading mode is changed over like the drive off mode→drive on mode as seen in FIG. 3. The drive off mode is only passed during the changeover process, and the drive on mode is established by a series of actions. The recording and reproduction controller 19 drives the spindle mechanism 18*a* to rotate at a point of time when chucking of the disk 114 is completed.

Thereafter, if a recording or reproduction operation is performed, then the action of the act2 described above is performed.

It is to be noted that the cartridge disk 90 enabled for recording or reproduction in this instance was inserted into the apparatus at a point of time in the past, and management information was read in upon the insertion. For example, when the power supply is switched off without ejecting the cartridge disk 90 as in the act5 or in act12 hereinafter described, if a process of storing the management information read out from the cartridge disk 90, for example, into the flash memory 24 or the like has been performed, then when the loading mode is changed over to the drive off mode in response to the power supply on operation, the management information need not be read in again. Naturally, however, if the management information is not stored when the power supply is switched off, then it is necessary to read out the management information similarly as upon insertion of the disk in the act1 described hereinabove.

.act7: when a recording or reproduction operation is performed in the shutter close mode.

The image pickup apparatus 1 may be in the shutter close mode while the power supply is on (refer to act10 or a modification hereinafter described). In particular, at a point of time when the user performs a recording or reproduction operation, the loading mechanism 40 may possibly be in the shutter close mode. In this instance, the system controller 11 controls the loading mechanism 40 with the drive on command so that the loading mode is changed over like the drive off mode→drive on mode as seen in FIG. 3. The drive off mode is only passed during the changeover process, and the drive on mode is established by a series of actions. The recording and reproduction controller 19 controls the spindle mechanism 18*a* to rotate at a point of time when chucking of the disk 114 is completed. Further, the system controller 11 issues the recording command (Rec) or the reproduction command (PB) to control the disk drive 18 to execute recording or reproduction through the recording and reproduction controller 19.

It is to be noted that, when a recording or reproduction operation is performed while the power supply is off in the shutter close mode, similar control may be performed after the power supply is switched on.

.act8: when a fixed period of time elapses while recording or reproduction is not performed in the drive on mode.

While the loading mechanism 40 stands by for the recording or reproduction in the drive on mode, the system controller 11 uses an internal timer to count the elapsed time of the standby mode. Then, if a certain predetermined period of time elapses while recording or reproduction is not performed, then the system controller 11 issues the drive off command to the loading mechanism 40 to change over the loading mode to the drive off mode. At this time, the recording and reproduction controller 19 controls the spindle mechanism 18*a* to stop the rotational driving.

.act9: when a recording or reproduction operation is performed in the drive off mode.

If the loading mechanism 40 is in the drive off mode when the user performs a recording or reproduction operation, then the system controller 11 controls the loading mechanism 40 with the drive on command to change over the loading mode to the drive on mode as seen in FIG. 4. The recording and reproduction controller 19 controls the spindle mechanism 18*a* to rotate at a point of time when chucking of the disk 114 is completed. Further, the system controller 11 issues the recording command (Rec) or the reproduction command (PB) to control the disk drive 18 to execute recording or reproduction through the recording and reproduction controller 19.

.act10: when a fixed period of time elapses while recording or reproduction is not performed in the drive off mode.

Also while the loading mechanism 40 stands by for the recording or reproduction in the drive off mode, the system controller 11 uses the internal timer to count the elapsed time of the standby mode. Then, if a certain predetermined period of time elapses while recording or reproduction is not performed, then the system controller 11 issues the shutter close command to the loading mechanism 40 to change over the loading mode to the shutter close mode.

.act11: when an eject operation is performed in the drive off mode.

If the user performs an eject operation for discharging the cartridge disk 90 on the operation section 27 in the drive off mode, then the system controller 11 issues commands in the following manner to the loading mechanism 40.

First, the system controller 11 issues the shutter close command to change over the loading mode to the shutter close mode. Further, after the changeover to the shutter close mode is completed, the system controller 11 issues the eject command to change over the loading mode to the eject mode. The discharging of the cartridge disk 90 is completed thereby.

It is to be noted that, if the user performs a recording operation during the process of the changeover to the eject mode, then the recording action is restored as indicated by an arrow mark act11a of a broken line. In particular, if a recording operation of the user is detected before the eject command is issued, then the system controller 11 does not issue the eject command but issues the drive on command to change over the loading mode to the drive on mode and then issue the recording command (Rec) to the recording and reproduction controller 19 so that recording action by the disk drive 18 may be performed.

.act12: when a power off operation is performed in the drive off mode.

If the user performs a power supply off operation of the image pickup apparatus 1 on the operation section 27 in the drive off mode, then the system controller 11 issues the shutter close command to the loading mechanism 40 to change over the loading mode to the shutter close mode.

Further, after the changeover to the shutter close mode is completed, power supply off control is performed for the power supply section 32.

On the other hand, even after the shutter close command is issued, if a recording operation of the user is detected before power supply off control is performed, then the system controller 11 does not perform the power supply off control but issues the drive on command to change over the loading mode to the drive on mode and issues the recording command to the recording and reproduction controller 19 so that recording action by the disk drive 18 may be performed (act12a).

.act13: when an eject operation is performed in the shutter close mode.

If the user performs an eject operation for discharging the cartridge disk 90 in the shutter close mode, then the system controller 11 issues the eject command to the loading mechanism 40 to change over the loading mode to the eject mode. Consequently, the cartridge disk 90 is discharged.

4. Process upon Ejection Operation

Figure 5:
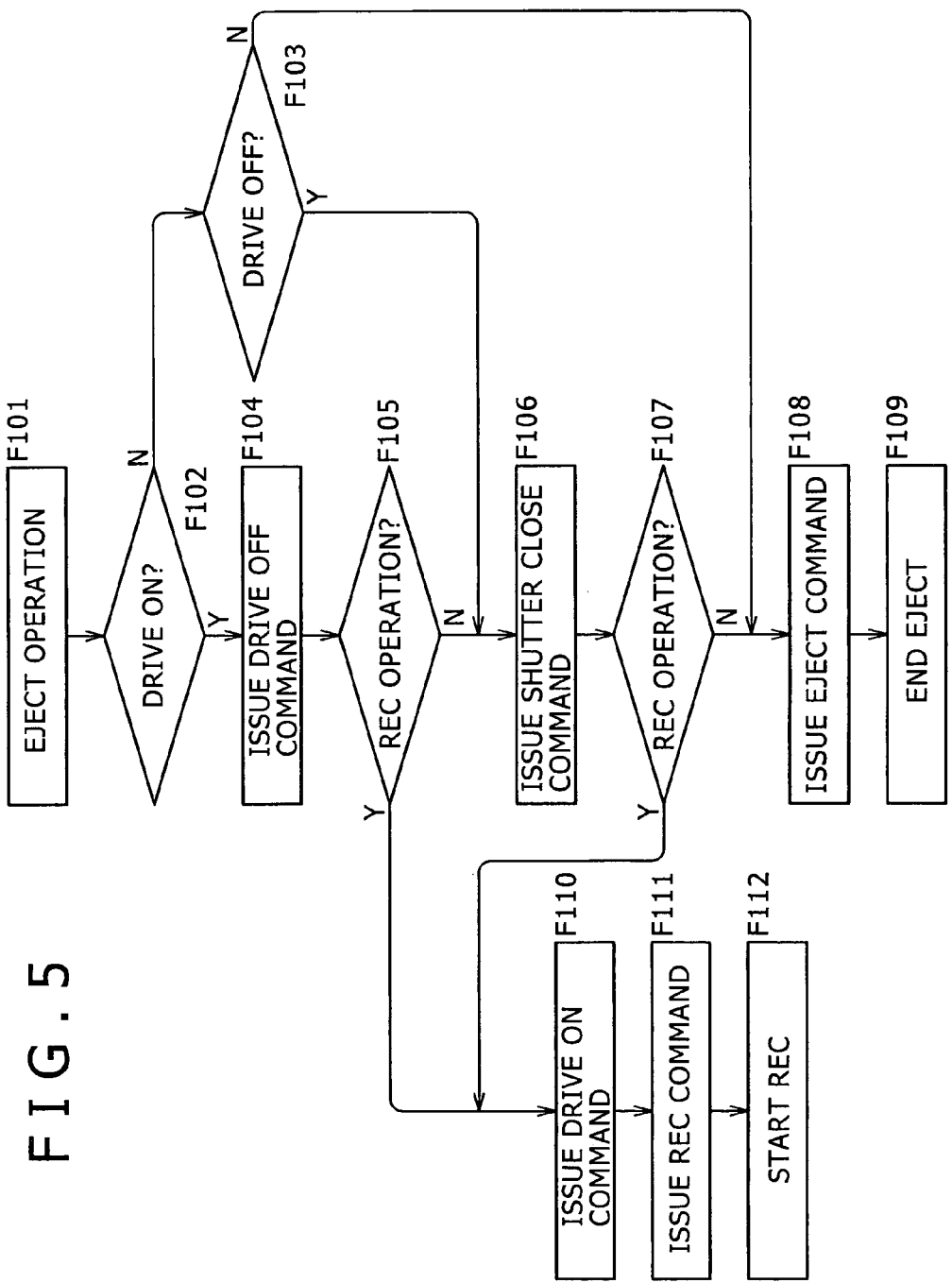
FIG. 5 is a flow chart illustrating a process when an ejection operation is performed on the image pickup apparatus of FIG. 1.

An example of a process of the system controller 11 when an eject operation is performed is illustrated in FIG. 5. The process implements the action of the act4, act11 and act13.

Referring to FIG. 5, if the system controller 11 detects, first at step F101, an eject operation from the operation section 27, then it first discriminates the current loading mode of the loading mechanism 40 (step F102).

If the current loading mode is the drive on mode, then the system controller 11 performs the process of the act4 described hereinabove. In particular, the processing advances from step F102 to F104, at which the system controller 11 first issues the drive off command to change over the loading mode of the loading mechanism 40 to the drive off mode. At this time, the drive off command is transmitted also to the recording and reproduction controller 19. Consequently, the recording and reproduction controller 19 stops rotational driving of the spindle mechanism 18a.

After the drive on command is issued, the system controller 11 stands by for the changeover to the drive off mode while it supervises whether or not a recording operation is performed at step F105. Then, if the changeover to the drive off mode is completed while a recording operation is not performed on the operation section 27, then the system controller 11 issues the shutter close command to change over the loading mode of the loading mechanism 40 to the shutter close mode at step F106.

After the shutter close command is issued, the system controller 11 stands by for the completion of the changeover to the shutter close mode while it supervises whether or not a recording operation is performed at step F107. Then, if the changeover to the shutter close mode is completed while a recording operation is not performed on the operation section 27, then the system controller 11 issues the eject command to change over the loading mode of the loading mechanism 40 to the eject mode at step F108. Consequently, the eject action is ended at step F109, and the cartridge disk 90 is discharged to the outside of the apparatus.

Incidentally, if the user performs a recording operation on the operation section 27 after the drive off command is issued at step F104, then the processing advances from step F105 to step F110. At step F110, the system controller 11 issues the drive on command to the loading mechanism 40 and the recording and reproduction controller 19 to control them to restore the drive on mode. Consequently, the loading mechanism 40 acts to change over the loading mode to the drive on mode, and the recording and reproduction controller 19 controls the spindle mechanism 18a to start rotational driving in response to completion of the disk chucking.

After the changeover to the drive on mode is completed, the system controller 11 issues the recording command to the recording and reproduction controller 19 at step F111. Consequently, the recording and reproduction controller 19 controls the disk drive 18 to execute recording (step F112). In other words, the action of the act4a described hereinabove is executed.

On the other hand, if the user performs a recording operation on the operation section 27 after the shutter close command is issued at step F106, then the processing advances from step F107 to step F110. At step F110, the system controller 11 issues the drive on command to the loading mechanism 40 and the recording and reproduction controller 19 so that the drive on mode may be restored. Consequently, the loading mechanism 40 performs action to change over the loading mode to the drive on mode, and the recording and reproduction controller 19 controls the spindle mechanism 18a to start rotational driving in response to completion of the disk chucking.

After the changeover to the drive on mode is completed, the system controller 11 issues the recording command to the recording and reproduction controller 19 at step F111. Consequently, the recording and reproduction controller 19 controls the disk drive 18 to execute recording (step F112). In other words, the action of the act4b described hereinabove is executed.

If the loading mechanism 40 is in the drive off mode at a point of time when an eject operation is performed, then the processing of the system controller 11 advances from step F103 to step F106. In this instance, the action of the act11 described hereinabove is executed. Thus, the system controller 11 first issues the shutter close command to changeover the loading mode of the loading mechanism 40 to the shutter close mode.

After the shutter close command is issued, the system controller 11 stands by for the completion of the changeover to the shutter close mode while it supervises to detect whether or not a recording operation is performed at step F107. Then, if the changeover to the shutter close mode is completed while no recording operation is performed on the operation section 27, then the system controller 11 issues the eject command to change over the loading mode of the loading mechanism 40 to the eject mode at step F108. Consequently, the eject action is ended and the cartridge disk 90 is discharged to the outside of the apparatus at step F109.

Further, if the user performs a recording operation on the operation section 27 after the shutter close command is issued at step F106 as the action of the act11, then the processing advances from step F107 to step F110. Then, as the processing successively advances like step F110→F111→F112 similarly as described above, recording is performed. In other words, the action of the act11b described hereinabove is performed.

If the loading mechanism 40 is in the shutter close mode at a point of time when an eject operation is performed, then the processing of the system controller 11 advances from step F103 to step F108, at which the system controller 11 issues an eject command. Consequently, the loading mechanism 40 changes over the loading mode to the eject mode, and the cartridge disk 90 is discharged to the outside of the apparatus at step F109. In other words, the action of the act13 described hereinabove is performed.

5. Process upon Power Off Operation

Now, an example of a process of the system controller 11 when a power off operation is performed is described with reference to FIG. 6. This process is executed to implement the act5 and the ac12 described hereinabove.

Figure 6:
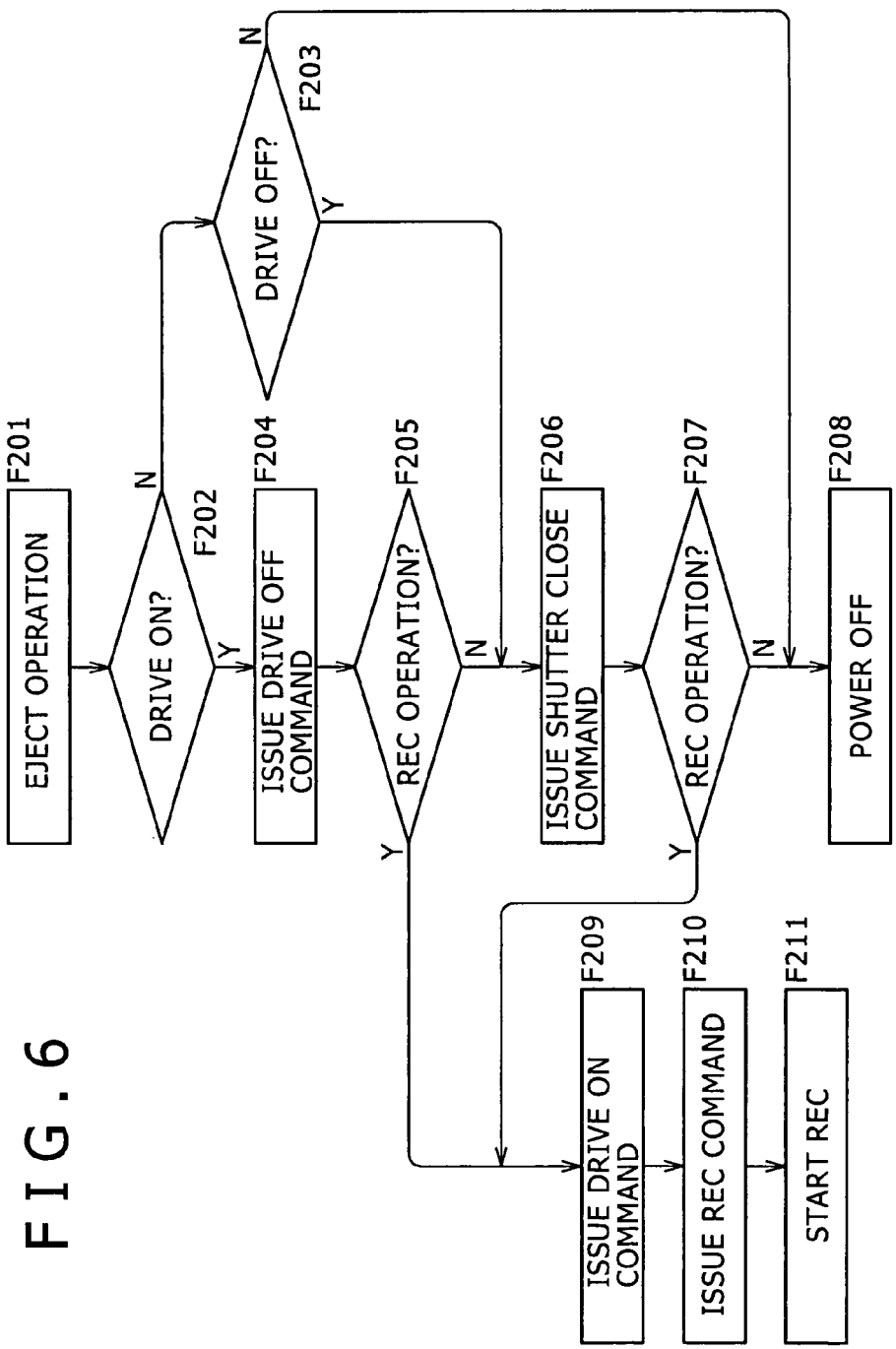
FIG. 6 is a flow chart illustrating a process when a power off operation is performed on the image pickup apparatus of FIG. 1.

Referring to FIG. 6, if the system controller 11 detects a power on operation from the operation section 27 at step F201, then it first decides the current mode of the loading mechanism 40.

If the loading mechanism 40 currently is in the drive on mode, then the system controller 11 performs the process of the act5 described hereinabove. In particular, the processing advances from step F202 to step F204, at which the system controller 11 issues the drive off command to control the loading mechanism 40 to change over the loading mode to the drive off mode. At this time, the system controller 11 sends the drive off command also to the recording and reproduction controller 19. Consequently, the recording and reproduction controller 19 controls the spindle mechanism 18a to stop the rotational driving.

After the drive off command is issued, the system controller 11 stands by for the completion of the changeover to the drive off mode while it supervises to detect whether or not a recording operation is performed at step F205. Then, if the changeover to the drive off mode is completed while no recording operation is performed on the operation section 27, then the system controller 11 issues the shutter close command to changeover the loading mode of the loading mechanism 40 to the shutter close mode at step F206.

After the shutter close command is issued, the system controller 11 stands by for the completion of the changeover to the shutter close mode while it supervises to detect whether or not a recording operation is performed at step F207. Then, if the changeover to the shutter close mode is completed while no recording operation is performed on the operation section 27, then the system controller 11 controls the power supply section 32 to switch off the power supply at step F208.

Incidentally, if the user performs a recording operation on the operation section 27 after the drive off command is issued at step F204, then the processing advances from step F205 to step F209. At step F209, the system controller 11 issues the drive on command to the loading mechanism 40 and the recording and reproduction controller 19 to control them to restore the drive on mode. Consequently, the loading mechanism 40 acts to change over the loading mode to the drive on mode, and the recording and reproduction controller 19 controls the spindle mechanism 18a to start rotational driving in response to completion of the disk chucking.

After the changeover to the drive on mode is completed, the system controller 11 issues the recording command to the recording and reproduction controller 19 at step F210. Consequently, the recording and reproduction controller 19 controls the disk drive 18 to execute recording (step F211). In other words, the action of the act5a described hereinabove is executed.

On the other hand, if the user performs a recording operation on the operation section 27 before the changeover to the shutter close mode is completed (before the power off control is executed) after the shutter close command is issued at step F206, then the processing advances from step F207 to step F209. At step F209, the system controller 11 issues the drive on command to the loading mechanism 40 and the recording and reproduction controller 19 so that the drive on mode may be restored. Consequently, the loading mechanism 40 performs action to change over the loading mode to the drive on mode, and the recording and reproduction controller 19 controls the spindle mechanism 18a to start rotational driving in response to completion of the disk chucking.

After the changeover to the drive on mode is completed, the system controller 11 issues the recording command to the recording and reproduction controller 19 at step F210. Consequently, the recording and reproduction controller 19 controls the disk drive 18 to execute recording (step F211). In other words, the action of the act5b described hereinabove is executed.

If the loading mechanism 40 is in the drive off mode at a point of time when a power off operation is performed, then the processing of the system controller 11 advances from step F203 to step F206. In this instance, the action of the act12 described hereinabove is executed. Thus, the system controller 11 first issues the shutter close command to change over the loading mode of the loading mechanism 40 to the shutter close mode.

After the shutter close command is issued, the system controller 11 stands by for the completion of the changeover to the shutter close mode while it supervises to detect whether or not a recording operation is performed at step F207. Then, if the changeover to the shutter close mode is completed while no recording operation is performed on the operation section 27, then the system controller 11 controls the power supply section 32 to switch off the power supply at step F208.

Further, if the user performs a recording operation on the operation section 27 after the shutter close command is issued at step F206 as the action of the act12, then the processing advances from step F207 to step F209. Then, as the processing successively advances like step F209→F210→F211 similarly as described above, recording is performed. In other words, the action of the act12a described hereinabove is performed.

If the loading mechanism 40 is in the shutter close mode at a point of time when an eject operation is performed, then the processing of the system controller 11 advances from step F203 to step F208, at which the system controller 11 controls the power supply section 32 to switch off the power supply. It is to be noted that, since the action in this instance does not involve mode changeover of the loading mechanism 40, no such changeover is illustrated in FIGS. 3 and 4.

6. Process When No Recording/Reproduction Operation is Performed

Figure 7:
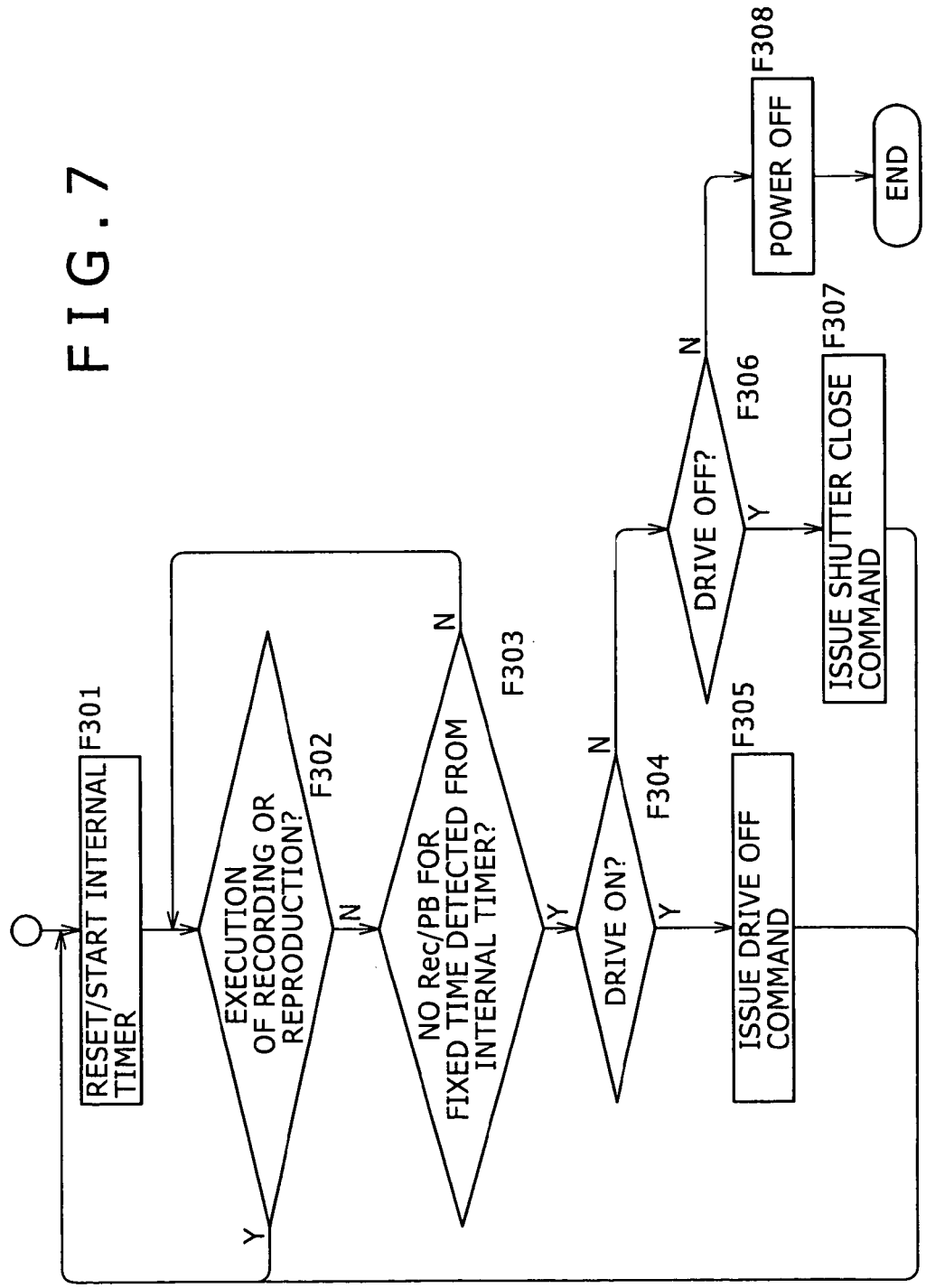
FIG. 7 is a flow chart illustrating a process when no operation is performed on the image pickup apparatus of FIG. 1.

In the present embodiment, the mode of the loading mechanism 40 sometimes changes over when a predetermined period of time elapses while recording or reproduction action is not performed as described hereinabove in connection with the act8 or act10. A process of the system controller 11 in this instance is illustrated in FIG. 7.

As described hereinabove, the system controller 11 uses the internal timer thereof to measure the time within which recording or reproduction action is not performed. In particular, referring to FIG. 7, the system controller 11 resets and starts the internal timer at step F301. Then, if recording or reproduction is performed at step F302, then the processing of the system controller 11 returns to step F301 to reset and start the internal timer.

If it is detected at step F303 from a measured value of the internal timer that a fixed period of time elapses, then the system controller 11 performs a process in accordance with the loading mode then.

In particular, when the loading mode is the drive on mode, then the processing of the system controller 11 advances from step F304 to step F305, at which the system controller 11 issues the drive off command to the loading mechanism 40 and the recording and reproduction controller 19 to execute changeover to the drive off mode and stopping of the spindle mechanism 18a, respectively. Thereafter, the processing returns to step F301. This is the action of the act8 described hereinabove.

On the other hand, if the loading mode is the drive off mode when the lapse of the fixed interval of time is detected at step F303, then the processing advances from step F306 to step F307, at which the system controller 11 issues the shutter close command to the loading mechanism 40 to execute changeover to the shutter close mode. Thereafter, the processing returns to step F301. This is the action of the act10 described hereinabove.

Further, if the loading mode is the shutter close mode when the lapse of the fixed interval of time is detected at step F303, then the processing advances from step F306 to step F308, at which the system controller 11 controls the power supply section 32 to switch off the power supply.

It is to be noted that the power supply off control at step F308 may not be performed. In other words, in the shutter close mode, another processing method may be adopted wherein the timing counting beginning with step F301 is not executed.

Also it is a possible idea to switch off the power supply without waiting for a fixed period of time after the shutter close mode is entered. In this instance, the power off control should be performed to end the processing at a point of time at which the shutter close mode is entered after the shutter close command is issued at step F307.

Further, in the process of FIG. 7, the period of time of the time counting (duration within which no recording or reproduction operation is performed) when the loading mode is changed over from the drive on mode to the drive off mode, the period of time of the time counting when the loading mode is changed over from the drive off mode to the shutter close mode and the period of time of the time counting when the power supply is switched off in the shutter close mode are set to an equal period of time as the certain fixed period of time to be decided at step F303. However, the periods of time mentioned may otherwise be set to individually different time lengths.

7. Advantages of the Embodiment and Modifications

With the embodiment described above, the following advantages can be achieved.

First, in the present embodiment, the shutter close mode and the drive off mode can be taken as a standby mode for the drive on mode.

In the drive off mode, the disk is released from disk chucking and the rotational driving of the spindle mechanism 18a is stopped. Further, the cartridge disk 90 is fed to a position spaced away from the optical pickup 18b. Consequently, in the standby mode for recording or reproduction, the power consumption can be reduced, and the disk 114 and the optical pickup 18b are not brought into collision with each other even by vibrations or an impact applied when the image pickup apparatus is carried or in a like case. This is advantageous for the protection of the optical pickup 18b and the disk 114 and for the protection of data recorded on the disk 114. Further, since the shutters 116a and 116b are open in the drive off mode, the drive on mode for recording or reproduction can be restored rapidly.

On the other hand, in the shutter close mode, the shutters 116a and 116b of the cartridge disk 90 are kept closed. Accordingly, where the shutter close mode is used for standby, a dust preventing function for the disk 114 can be exhibited in addition to the protection function against a disturbance and the power supply reduction effect in the drive off mode. Particularly, such a manner of use that the image pickup apparatus is carried while the cartridge disk 90 remains loaded therein frequently occurs, and in such an instance, it is appropriate to use the shutter close mode in which the dust preventing effect can be achieved.

Further, according to the process of FIG. 7, the shutter close mode and the drive off mode can be selectively used suitably as the standby mode for the drive on mode. In particular, for example, even if recording or reproduction is not being performed, where the possibility that a recording or reproduction instruction may be issued is high (a recording or reproduction operation is not performed while the loading mode remains in the drive on mode), if the loading mode is changed over to the drive off mode, then the protection effect against vibrations and so forth and the power saving effect can be exhibited. Further, even if a recording or reproduction operation is performed, the period of time required to restore the recording or reproduction action can be reduced.

On the other hand, if the possibility that recording or reproduction may be executed becomes lower, then the shutter close mode is established, and consequently, the dust preventing effect can be exhibited in addition to the protection effect and the power saving effect.

Further, while, in the example of the process illustrated in FIG. 7, the power supply is switched off when a fixed period of time elapses while recording or reproduction is not performed in the shutter close mode, this can promote the power saving effect and is particularly suitable for an apparatus of the battery driven type.

Further, as described as the process of FIG. 5, when an eject request is issued, the drive off command, shutter close command and eject command are issued separately from one another. Consequently, restoration of recording action in the process of the eject request can be performed rapidly.

In particular, since the transition changeover up to the eject mode is not executed as a series of actions by a single command, if the system controller 11 detects, in the procedure while mode changeover instruction commands are successively issued in response to an eject operation, that a recording or reproduction operation is performed at a point of time before an eject instruction is issued, then the system controller 11 can cause the transition changeover up to the eject mode to be interrupted and restore the recording action mode. In short, recording or reproduction can be executed by stopping the issuance of the eject command but issuing the drive on command and the recording command.

Further, at this time, since the cartridge disk 90 is not discharged although an ejection operation has been performed, the system controller 11 (recording and reproduction controller 19) need not read out management information for recording on or reproduction from the disk 114 and can start recording or reproduction action immediately.

Consequently, recording can be started without waiting for action which requires a comparatively long period of time such as, for example, a period of time required for completion of eject, a period of time required for re-loading and a period of time required for reading out of management information from a recording medium upon re-loading. This is very advantageous in that image pickup can be performed without losing an image pickup chance and so forth.

Further, where the power supply is switched off after the shutter close mode is entered in response to a power off operation as described as the process of FIG. 6, when the power supply is off, the cartridge recording medium in the apparatus can be kept in a state wherein the shutter mechanism is closed. Consequently, the dust preventing function described above can be exhibited effectively. Further, since necessary commands are successively issued also upon power off operation, if a recording operation is performed within a period before the power supply off control is executed, then the loading mode can changed over up to the recording action mode without performing the power off control. Consequently, rapid starting of recording can be anticipated.

According to the present invention, various medications are considered possible.

Such mode changeover as illustrated in FIGS. 3 and 4 may be modified such that a user operation intended to establish a certain mode is performed directly in addition to the eject operation and the power off operation. In particular, an operation key or the like may be provided additionally by which the user can use to directly issue an instruction to establish the drive off mode or the shutter close mode.

Then, if the drive off operation key is depressed, for example, in the drive on mode, then the loading mode is changed over to the drive off mode similarly to the act8 described hereinabove. Further, if the shutter close operation key is depressed in the drive off mode, then the loading mode is changed over to the shutter close mode as in the act10. Consequently, a suitable standby mode can be taken based on the will of the user.

It is to be noted that such operations as described above may be combined with the changeover which depends upon the time counting of FIG. 7. In other words, the loading mode is changed over depending upon that recording or reproduction is not performed for a fixed period of time or that an operation for issuing an instruction of the changeover described above is performed.

Further, if a shutter close operation is performed in the drive off mode, then the drive off command and the shutter close command are issued successively as in the act5. In this instance, the power off control may be executed at a point of time when the shutter close mode is established, or the power off state may be maintained. Where the power off state is maintained, the process of FIG. 7 may be applied such that, if recording or reproduction is not performed within a fixed period of time, then the power supply is switched off.

Further, as described in connection with the act5 and FIG. 6 above, also when a power off operation is performed, a recording operation is supervised before power off control is executed. However, also another process is possible that, when a power off operation is performed, supervision of a recording operation is not performed.

Or, changeover to the recording action in response to a recording operation after the power supply is switched off may be performed only in the case of the act5a described hereinabove. In other words, a recording operation is supervised only before the shutter close command is issued, but this is not performed in the case of the act5b and the act12a described hereinabove.

Further, while changeover to recording action is described as action in the act4a, act4b, act5a, act5b and act12a hereinabove, also when a reproduction operation is performed immediately after an ejection operation or a power off operation is performed, such action may be applied to establish a reproduction state by changeover.

While the loading mechanism 40 can assume the four modes of the drive on mode, drive off mode, shutter close mode and eject mode, the drive off state may be used only as a transient mode during the mode transition such that the drive on mode is not maintained continuously.

While the embodiment described above is an image pickup apparatus which performs recording of a video image, the present invention can be applied also to an audio recording and reproduction apparatus and further to a recording and reproduction apparatus which records or reproduces information received by wire communication or by wireless communication.

Further, the present invention can be applied not only to recording and reproduction apparatus but also to reproduction apparatus only for reproduction or only for recording.

Further, as regards a recording medium to be used with the recording or reproduction apparatus, the present invention can be applied to any recording medium only if it is of the type wherein a medium is accommodated in a cartridge. Thus, according to the present invention, the recording or reproduction apparatus can be implemented as an apparatus which is ready for a cartridge recording medium wherein a medium such as an optical disk, a magneto-optical disk, a magnetic disk or a magnetic tape is accommodated in a cartridge.

While a preferred embodiment of the present invention has been described using specific terms, such description is for illustrative purposes only, and it is to be understood that changes and variations may be made without departing from the spirit or scope of the following claims.

What is claimed is:

1. A recording or reproduction apparatus for use with a cartridge recording medium wherein a recording medium is accommodated in a cartridge in such a manner as to be exposed/covered by opening/closing of a shutter mechanism formed in said cartridge, comprising:

driving means for driving the recording medium of the cartridge recording medium to perform recording or reproduction action;

head means for recording or reproducing information on or from the recording medium driven by said driving means;

loading means for opening the shutter mechanism of the cartridge recording medium inserted therein and loading the cartridge recording medium into a state wherein the recording medium can be recorded or reproduced by said driving means and said head means; and control means for controlling action of said loading means, driving means and head means;

said control means being operable to control an action mode of said loading means to a shutter close mode wherein at least the recording medium is not driven by said driving means and the shutter mechanism is closed as one of modes during transition between an eject mode wherein the cartridge recording medium is not inserted in said loading means and a drive on mode wherein the recording medium in the cartridge recording medium is driven by said driving means, wherein said control means issues, when a request to discharge the cartridge recording medium is issued, at least a shutter close instruction to said loading means to close the shutter mechanism into the closed state and then issues an eject instruction to said loading means to establish the eject mode, and wherein, if said control means detects, when the request to discharge is issued, that a recording or reproduction request is issued at a point of time before the eject instruction is issued, then said control means interrupts the control triggered by the request to discharge and then issues a drive on instruction to said loading means to establish the drive on mode, and then controls said head means to start recording or reproduction action on or from the recording medium.

2. The recording or reproduction apparatus according to claim 1, wherein said control means is operable to control the action mode of said loading means to a drive off mode wherein the driving by said driving means is in an off state and the recording medium is spaced away from said driving means and besides the shutter mechanism is open as another one of modes during the transition between the shutter close mode and the drive on mode.

3. The recording or reproduction apparatus according to claim 2, wherein said control means issues, when a request to discharge the cartridge recording medium is issued in the drive on mode, a drive off instruction to said loading means to establish the drive off mode and then issues a shutter close instruction to said loading means to establish the shutter close mode, and thereafter issues an eject instruction to said loading means to establish the eject mode.

4. A recording or reproduction apparatus for use with a cartridge recording medium wherein a recording medium is accommodated in a cartridge in such a manner as to be exposed/covered by opening/closing of a shutter mechanism formed in said cartridge, comprising:

driving means for driving the recording medium of the cartridge recording medium to perform recording or reproduction action;

head means for recording or reproducing information on or from the recording medium driven by said driving means;

loading means for opening the shutter mechanism of the cartridge recording medium inserted therein and loading the cartridge recording medium into a state wherein the recording medium can be recorded or reproduced by said driving means and said head means; and control means for controlling action of said loading means, driving means and head means;

said control means being operable to control an action mode of said loading means to a shutter close mode wherein at least the recording medium is not driven by said driving means and the shutter mechanism is closed as one of modes during transition between an eject mode wherein the cartridge recording medium is not inserted in said loading means and a drive on mode wherein the recording medium in the cartridge recording medium is driven by said driving means, wherein said control means issues, when a power supply off request is issued, at least a shutter close instruction to said loading means to establish the shutter close mode and then performs control to switch off the power supply.

5. A recording or reproduction apparatus for use with a cartridge recording medium wherein a recording medium is accommodated in a cartridge in such a manner as to be exposed/covered by opening/closing of a shutter mechanism formed in said cartridge, comprising:

driving means for driving the recording medium of the cartridge recording medium to perform recording or reproduction action;

head means for recording or reproducing information on or from the recording medium driven by said driving means;

loading means for opening the shutter mechanism of the cartridge recording medium inserted therein and loading the cartridge recording medium into a state wherein the recording medium can be recorded or reproduced by said driving means and said head means; and control means for controlling action of said loading means, driving means and head means;

said control means being operable to control an action mode of said loading means to a shutter close mode wherein at least the recording medium is not driven by said driving means and the shutter mechanism is closed as one of modes during transition between an eject mode wherein the cartridge recording medium is not inserted in said loading means and a drive on mode wherein the recording medium in the cartridge recording medium is driven by said driving means, wherein said control means issues, when recording or reproduction action is not performed for more than a predetermined period of time, a shutter close instruction to said loading means to establish the shutter close mode.

6. A recording or reproduction apparatus for use with a cartridge recording medium wherein a recording medium is accommodated in a cartridge in such a manner as to be exposed/covered by opening/closing of a shutter mechanism formed in said cartridge, comprising:

driving means for driving the recording medium of the cartridge recording medium to perform recording or reproduction action;

head means for recording or reproducing information on or from the recording medium driven by said driving means;

loading means for opening the shutter mechanism of the cartridge recording medium inserted therein and loading the cartridge recording medium into a state wherein the recording medium can be recorded or reproduced by said driving means and said head means; and control means for controlling action of said loading means, driving means and head means;

said control means being operable to control an action mode of said loading means to a shutter close mode wherein at least the recording medium is not driven by said driving means and the shutter mechanism is closed as one of modes during transition between an eject mode wherein the cartridge recording medium is not inserted in said loading means and a drive on mode wherein the recording medium in the cartridge recording medium is driven by said driving means, wherein said control means is operable to control the action mode of said loading means to a drive off mode wherein the driving by said driving means is in an off state and the recording medium is spaced away from said driving means and besides the shutter mechanism is open as another one of modes during the transition between the shutter close mode and the drive on mode, and wherein said control means issues, when recording or reproduction action is not performed for more than a predetermined period of time, a drive off instruction to said loading means to establish the drive off mode.

7. The recording or reproduction apparatus according to claim 1, wherein the recording medium of the cartridge recording medium is a disk, and said driving means drives the disk to rotate.

8. A recording or reproduction apparatus for use with a cartridge recording medium wherein a recording medium is accommodated in a cartridge in such a manner as to be exposed/covered by opening/closing of a shutter mechanism formed in said cartridge, comprising:

a driving unit for driving the recording medium of the cartridge recording medium to perform recording or reproduction action;

a head unit for recording or reproducing information on or from the recording medium driven by said driving unit;

a loading unit for opening the shutter mechanism of the cartridge recording medium inserted therein and loading the cartridge recording medium into a state wherein the recording medium can be recorded or reproduced by said driving unit and said head unit; and a control unit for controlling action of said loading unit, driving unit and head unit;

said control unit being operable to control an action mode of said loading unit to a shutter close mode wherein at least the recording medium is not driven by said driving unit and the shutter mechanism is closed as one of modes during transition between an eject mode wherein the cartridge recording medium is not inserted in said loading unit and a drive on mode wherein the recording medium in the cartridge recording medium is driven by said driving unit, wherein said control unit issues, when recording or reproduction action is not performed for more than a predetermined period of time, a shutter close instruction to said loading unit to establish the shutter close mode.

9. The recording or reproduction apparatus according to claim 4, wherein said control means is operable to control the action mode of said loading means to a drive off mode wherein the driving by said driving means is in an off state and the recording medium is spaced away from said driving means and besides the shutter mechanism is open as another one of modes during the transition between the shutter close mode and the drive on mode.

10. The recording or reproduction apparatus according to claim 9, wherein said control means issues, when a request to discharge the cartridge recording medium is issued in the drive on mode, a drive off instruction to said loading means to establish the drive off mode and then issues the shutter close instruction to said loading means to establish the shutter close mode, and thereafter issues an eject instruction to said loading means to establish the eject mode.

11. The recording or reproduction apparatus according to claim 5, wherein said control means is operable to control the action mode of said loading means to a drive off mode wherein the driving by said driving means is in an off state and the recording medium is spaced away from said driving means and besides the shutter mechanism is open as another one of modes during the transition between the shutter close mode and the drive on mode.

12. The recording or reproduction apparatus according to claim 11, wherein said control means issues, when a request to discharge the cartridge recording medium is issued in the drive on mode, a drive off instruction to said loading means to establish the drive off mode and then issues the shutter close instruction to said loading means to establish the shutter close mode, and thereafter issues an eject instruction to said loading means to establish the eject mode.

13. The recording or reproduction apparatus according to claim 8, wherein said control unit is operable to control the action mode of said loading unit to a drive off mode wherein the driving by said driving unit is in an off state and the recording medium is spaced away from said driving unit and besides the shutter mechanism is open as another one of modes during the transition between the shutter close mode and the drive on mode.

14. The recording or reproduction apparatus according to claim 13, wherein said control unit issues, when a request to discharge the cartridge recording medium is issued in the drive on mode, a drive off instruction to said loading unit to establish the drive off mode and then issues a shutter close instruction to said loading unit to establish the shutter close mode, and thereafter issues an eject instruction to said loading unit to establish the eject mode.

* * * * *